United States Patent [19]

Yamaguchi et al.

[11] 4,109,143
[45] Aug. 22, 1978

[54] OPTICAL READER

[75] Inventors: Tetsuo Yamaguchi; Toshihide Hane; Hidehiro Ochiai; Shuzi Harada, all of Yokohama, Japan

[73] Assignee: Matsushita Electric Industrial Co., Ltd., Osaka, Japan

[21] Appl. No.: 697,479

[22] Filed: Jun. 18, 1976

[51] Int. Cl.² .................. G06C 15/00; G06K 7/10; G06K 9/00

[52] U.S. Cl. .................. 235/462; 340/146.3 Z; 235/419

[58] Field of Search ........... 235/61.11 E, 61.11 D, 235/61.11 A, 61.12 N, 61.7 B, 61.7 R; 340/149 A, 146.3 K, 146.3 Z; 250/569

[56] References Cited

U.S. PATENT DOCUMENTS

| | | | |
|---|---|---|---|
| 3,553,433 | 1/1971 | Sorli | 340/146.3 K |
| 3,663,800 | 5/1972 | Myer | 235/61.12 N |
| 3,711,683 | 1/1973 | Hamisch | 235/61.12 N |
| 3,735,096 | 5/1973 | Knockeart | 235/61.11 E |
| 3,959,624 | 5/1976 | Kaslow | 235/61.11 E |

*Primary Examiner*—Robert M. Kilgore
*Attorney, Agent, or Firm*—Stevens, Davis, Miller & Mosher

[57] ABSTRACT

An optical reader capable of optically reading a plurality of data comprises an object to be read having different coded information placed thereon, with each information having a unique control code, scan means for producing scanning light to be projected to said object, photo-electric conversion means for converting scattered light produced by the scan to an electrical signal, means for determining said control code and information by said electrical signal and means for sorting the information by said control code for storage, whereby different information is optically read while it is sorted by the control code unique to the respective information and stored.

1 Claim, 9 Drawing Figures

| | SYMBOL | | CODE |
|---|---|---|---|
| 0 |  | \| | 0 0 0 0 0 1 1 |
| 1 |  | \| | 0 0 0 0 1 1 0 |
| 2 |  | \| | 0 0 0 1 0 0 1 |
| 3 |  | \| | 1 1 0 0 0 0 0 |
| 4 |  | \| | 0 0 1 0 0 1 0 |
| 5 |  | \| | 1 0 0 0 0 1 0 |
| 6 |  | \| | 0 1 0 0 0 0 1 |
| 7 |  | \| | 0 1 0 0 1 0 0 |
| 8 |  | \| | 0 1 1 0 0 0 0 |
| 9 |  | \| | 1 0 0 1 0 0 0 |
| a |  | \| | 0 0 1 1 0 1 0 |
| b |  | \| | 0 1 0 1 0 0 1 |
| c |  | \| | 0 0 0 1 0 1 1 |

OPTICAL READER

The present invention relates to an optical reader capable of optically reading a plurality of data.

As automation and man-power saving in data processing proceed, the automation of a data entry device has been rapidly developing. As an example, a POS system has been known in retail shops, in which a goods number and price have been coded on a price card by bars and spaces and the price card is thereafter optically scanned for reading the information thereon for processing.

As a coding method using bars and spaces, the method proposed by Pitney Bowes Corp. is explained. In FIG. 1, the numerals 0 – 9 are represented by two-out-of-seven code with a wide width representing "1" and a narrow width representing "0" irrespective of the bar and the space. The symbols $a$, $b$ and $c$ are used to indicate ends of the code.

Figure 1:
FIG. 1 shows codes using bars and spaces in accordance with a prior art reading system.
Figure 1:
Figure 1:
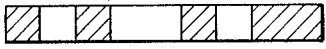
Figure 1:
Figure 1:
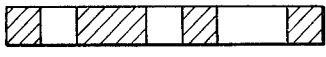
Figure 1:
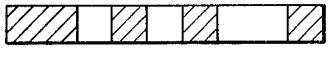
Figure 1:
Figure 1:
Figure 1:
Figure 1:
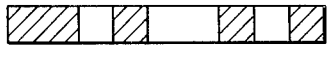
Figure 1:
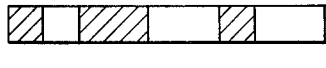
Figure 1:
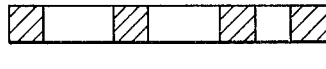
Figure 1:
Figure 2:
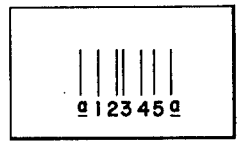
FIG. 2 is a front view of a price card in accordance with a prior art reading system.
Figure 3:
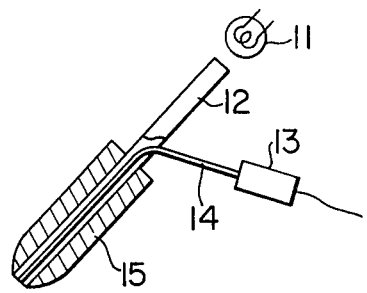
FIG. 3 is a side sectional view of a prior art light source and receiving device for scanning the price card of FIG. 2.

A price card in a prior art POS system has been constructed as shown in FIG. 2 using the codes shown in FIG. 1. It is read by manual operation of a light pen 15, shown in FIG. 3, which integrally incorporates a light transmitting fiber 12 into which light is injected by a lamp 11 and a light receiving fiber 14 connected to a light sensor 13. One drawback of this system is its slow rate of reading.

It is an object of the present invention to eliminate the above drawback and to permit reading at a high rate while separating a plurality of data from each other.

According to the present invention, an optical reader system is provided which comprises an object to be read having different coded information placed thereon with each information having a unique control code, scan means for producing scanning light to be projected to said object, photo-electric conversion means for converting scattered light produced by the scan to an electrical signal, means for determining said control code and information by said electrical signal and means for sorting the information by said control code for storage.

The optical reader in accordance with the present invention is now explained in detail in conjunction with the preferred embodiment thereof.

Figure 4:
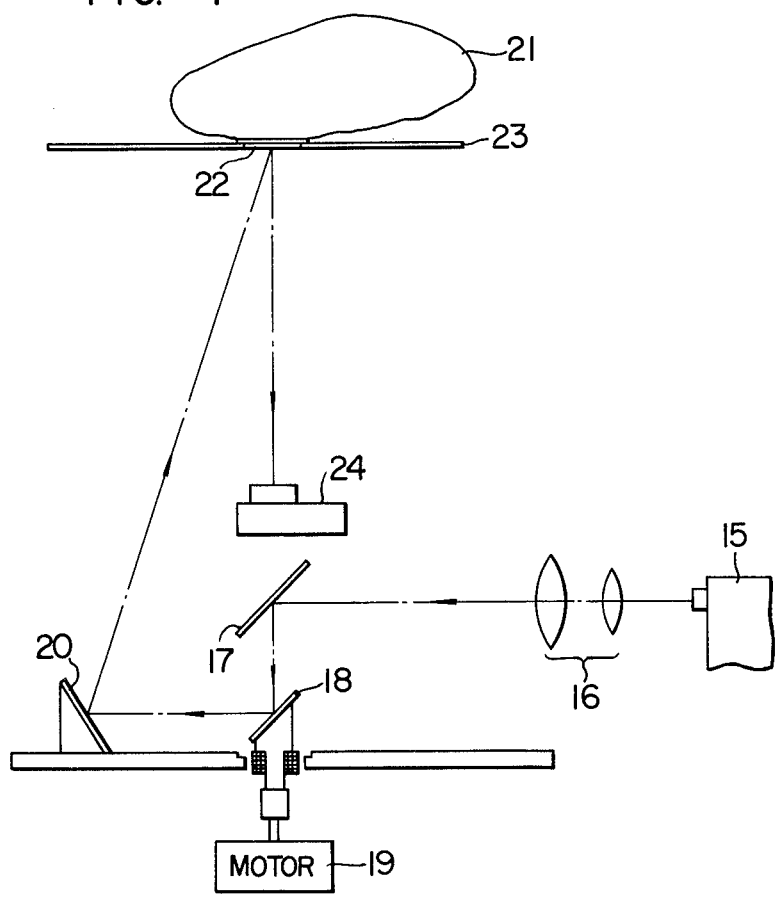
FIG. 4 shows the construction of an optical reader in one embodiment of the present invention.

FIG. 4 shows an optical construction of the embodiment of the present invention, in which reference numeral 15 is a light source for producing a laser beam, 16 a focusing lens, 17 a stationary mirror, 18 a rotating mirror driven by a motor 19, 20 a stationary mirror, 21 merchandise on which a price card 22 has been placed, 23 a table on which goods are placed. Numeral 24 denotes a light detector for converting a reflected light signal to an electrical signal. An output from the light detector is applied to a read circuit connected to a succeeding stage.

The operation of the described apparatus is as follows. The laser beam emitted from the light source 15 is focused by the lens 16 and deflected by the stationary mirror 17 to impinge upon the rotating mirror 18. The laser beam is then directed to the stationary mirrors 20 by the rotating mirror 18. Since the stationary mirrors 20 are planar and they are arranged at an appropriate interval, radial scanning light is directed to the price card 22. Accordingly, an optimum scan is accomplished by the radial scanning light no matter what direction the price card 22 is oriented. Reflected light from the price card 22 is detected by the light detector 24 and converted to an electric signal.

Figure 5:
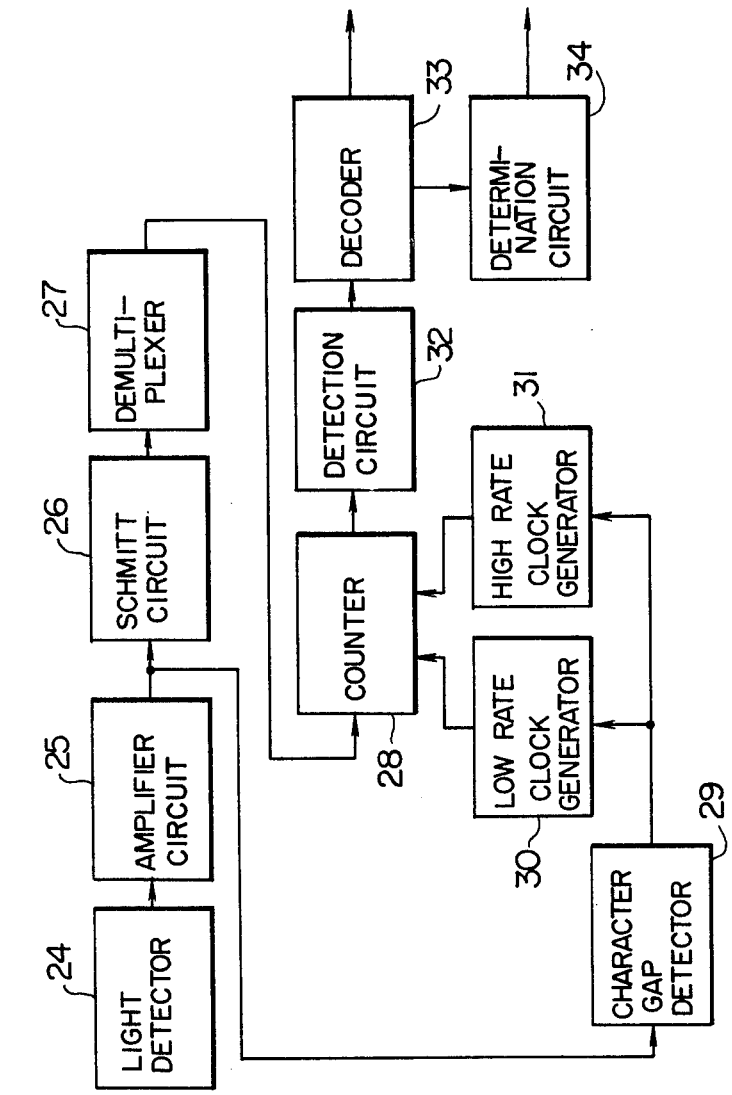
FIG. 5 is a block diagram illustrating the electrical construction of one embodiment of the present invention.
Figure 6:
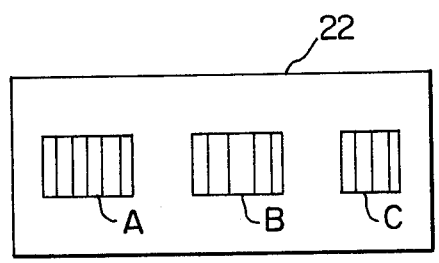
FIG. 6 shows a front view of a price card used in the present invention.
Figure 7:
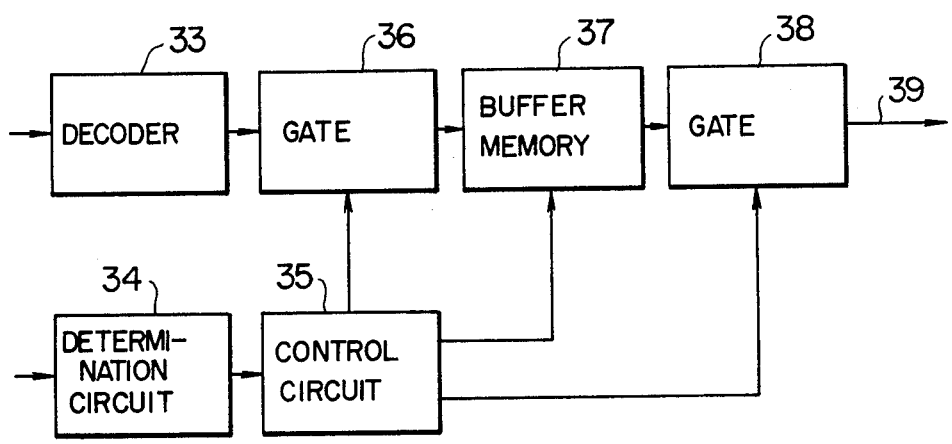
FIG. 7 is a block diagram showing an electrical construction of another major portion of one embodiment of the present invention.

FIG. 5 shows a determination circuit for processing the signal detected by the light detector 24. The output of the light detector 24 is amplified and shaped by an amplifier circuit 25, which produces a pulse signal. This signal is applied to a Schmitt circuit 26 which produces pulses at the leading and trailing edges thereof. These pulses are applied to a demultiplexer 27 to sequentially select each of counters 28 provided for each of the bits in a character (seven counters in the code shown in FIG. 1), for operation. A circuit 29 detects a gap (space) between characters and actuates a circuit 30 for producing a low rate clock when no gap is detected. Also, it actuates a circuit 31 for producing a high rate clock at as several times as high rate as the low rate clock when a gap is detected. Since each of the counters 28 counts in accordance with a bit width of the character, the sequence of the occurrence of overflows of the counters when the high rate clock is simultaneously applied to all of the counters depends on the bit width. The overflows are detected by a detection circuit 32 and converted to another code by a decoder 33. The control code is detected by a determination circuit 34.

Where different information A, B and C used in various stages of trading of the merchandise are coded by bars and spaces on the price card 22 as shown in FIG. 6, it is necessary to provide a memory section as shown in FIG. 7 in the apparatus of FIG. 5 in order to read all of the information. The memory section is now explained. By detecting the control code $a$ by the determination circuit 34, it is possible to determine whether the control circuit 35 has received that signal before.

If the signal $a$ has not been received before, a gate 36 is opened to apply clock pulses to a buffer memory 37 to store the signal therein. Similar operations are repeated for the following control signals $b$ and $c$ to store respective information in the buffer memory. During the operation, if the information which has been received before and stored in the buffer memory is received, gate 36 is closed to block the input of the signal.

In this manner, when predetermined information is applied to the buffer memory 37, a gate 38 is opened and the content of the buffer memory 37 is delivered to an output terminal 39. Thus, a plurality of information is simultaneously read, and decoded signals or signals converted to another code are derived.

When the price card 22 is labeled inversely so that data appear in reverse order, a buffer register for inverting the shift direction of the decoder 33 may be provided to invert the direction of reading shift and the direction of reading shift to obtain the data in normal order. Alternatively the data may be reordered when they are written into the buffer memory 37.

Figure 8:
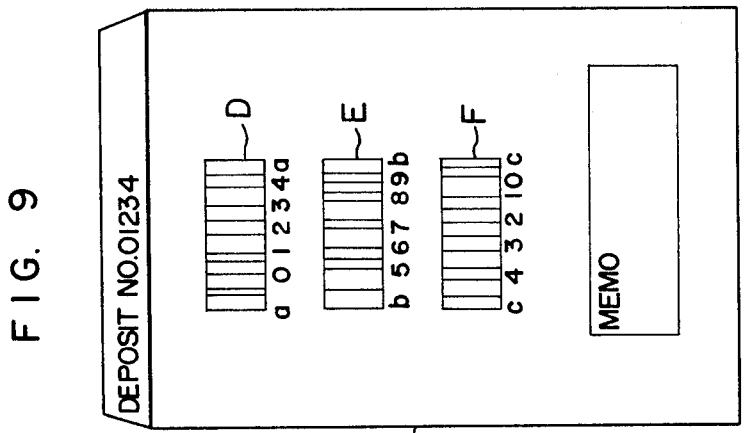
FIG. 8 is a block diagram of other embodiment of the invention.

FIG. 8 illustrates the automation of the issuance of a shipment slip of a color laboratory which conducts developing and printing of color films. Reference numeral 40 denotes an apparatus similar to the optical reader illustrated in FIGS. 4 to 7, 41 a keyboard, 42 an electronic computer, 43 a controller, 44 a memory, 45 a paper tape reader, 46 a punching machine and 47 a printer.

Figure 9:
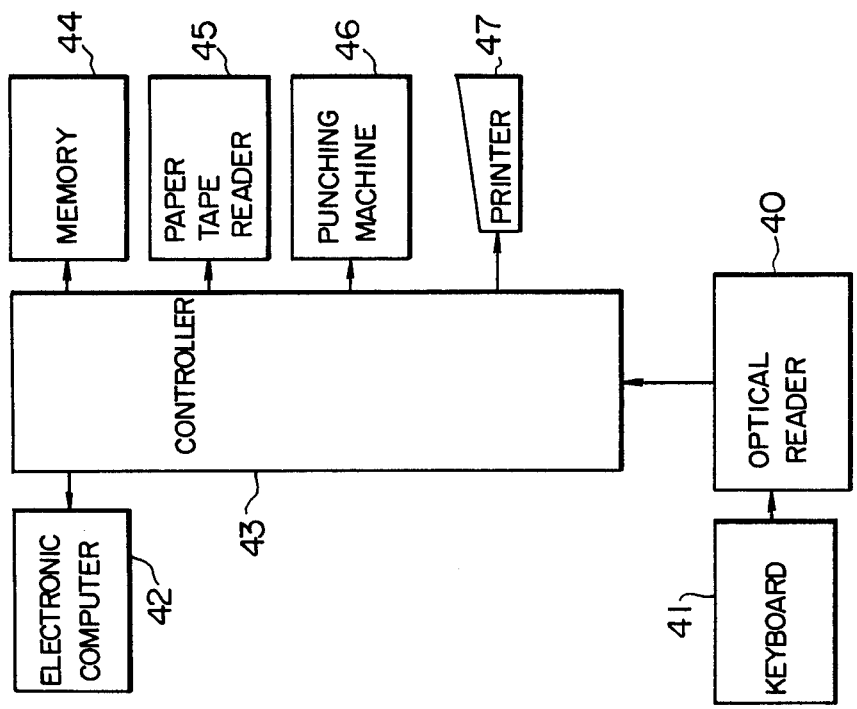
FIG. 9 is a front view of an envelope on which a plurality of different pieces of information have been printed.

FIG. 9 shows a photograph envelope 48 on which serial number code D, shop name code E and work code F have been printed.

The information C, D and E printed on the envelope 48 shown in FIG. 9 are simultaneously read by the optical reader 40 and processed by the electronic computer 42 based on the information to print out information in the memory 44 which files various data on the slip processing, by the printer 47 for issuing a desired slip. In this manner, by the use of the optical reader, the slip issuance system can be considerably rationalized.

As seen from the above embodiment, since the present invention optically reads different information and sorts it for storage, a plurality of information can be held in a readily processed state. Furthermore, since a plurality of information can be sorted for storage by the control codes unique to the respective information, reading operation can be conducted at a high rate. Moreover, when the same information is scanned again, it is not read.

What is claimed is:

1. An optical reader system comprising an object to be read having at least two pieces of coded information thereon, with each piece of information having a unique control code associated with it, scan means for producing scanning light to be projected onto said object, photo-electric conversion means for converting scattered light produced by the scan and reflected from said object to an electrical signal, means for detecting said at least two pieces of coded information and associated control codes from said electrical signal and means for sorting and storing said at least two pieces of coded information in accordance with said associated control codes.

* * * * *